(12) United States Patent
Ngin

(10) Patent No.: US 6,683,583 B2
(45) Date of Patent: Jan. 27, 2004

(54) FLEXIBLE ELECTRODE ANTENNA

(75) Inventor: Sywong Ngin, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/169,267

(22) PCT Filed: Feb. 8, 2001

(86) PCT No.: PCT/US01/04057

§ 371 (c)(1),
(2), (4) Date: Jun. 27, 2002

(87) PCT Pub. No.: WO01/59880

PCT Pub. Date: Aug. 16, 2001

(65) Prior Publication Data

US 2003/0080915 A1 May 1, 2003

Related U.S. Application Data

(60) Provisional application No. 60/182,089, filed on Feb. 11, 2000.

(51) Int. Cl.$^7$ ................................................. H01Q 1/36
(52) U.S. Cl. ....................................................... 343/897
(58) Field of Search .......................... 343/897, 700 MS, 343/872; 252/500, 510, 511; 340/437, 666, 667; 442/232, 316, 319; 428/356; 219/543; 324/663

(56) References Cited

U.S. PATENT DOCUMENTS

| 3,526,573 | A | | 9/1970 | Martello et al. ............. 442/232 |
| 4,919,744 | A | * | 4/1990 | Newman ................... 156/308.2 |
| 5,679,277 | A | * | 10/1997 | Niibe et al. .................. 219/543 |
| 5,914,610 | A | | 6/1999 | Gershenfeld et al. ....... 324/663 |
| 5,936,412 | A | | 8/1999 | Gershenfeld et al. ....... 324/663 |

FOREIGN PATENT DOCUMENTS

DE 36 03 260 A 8/1987 ............ H05K/1/03

* cited by examiner

Primary Examiner—Hoang V. Nguyen
(74) Attorney, Agent, or Firm—Melanie G. Gover

(57) ABSTRACT

The invention provides a flexible electrode antenna having a layer of conductive material laminated between a layer of flame retardant material and a layer of protective material. The layer of conductive material is preferably a metalized polymer substrate having corrosion resistant properties. The flame retardant material is preferably a glass cloth, while the protective material is preferably a non-woven material.

10 Claims, 6 Drawing Sheets

FLEXIBLE ELECTRODE ANTENNA

This application claims the benefit of prov. application 60/182,089 filed on Feb. 11, 2000.

BACKGROUND

The present invention relates to electrode antennas, and particularly to an electrode antenna with sufficient reliability, flexibility and durability for use as a sensing element in a system for sensing the presence of a person in a defined space.

As discussed, for example, in U.S. Pat. Nos. 5,914,610 and 5,936,412. The ability to determine the position, orientation or presence of a person within a defined space is important in applications ranging from medical treatments to safety and security. For applications where determining the position, orientation or presence of a person within a defined space is important, sensor arrays have been developed to allow automatic monitoring of the defined space. Such sensor arrays and methods for resolving a presence in a defined space are taught in the above-referenced patents.

Although the method for resolving a presence or activity in a defined space using sensor arrays is known, the ability to adapt those sensor arrays to a particular environment is not addressed in the prior art. Specifically, in uses where the sensor array is used to monitor or detect the presence or activity of a person, additional factors come into play which may greatly impact the acceptance of the sensor array by the individual being sensed. For example, an expected use of these sensor arrays and methods as described in U.S. Pat. Nos. 5,914,610 and 5,936,412 is in an automobile seat for regulating the deployment of airbags. While any variety of electrodes may work suitably for detecting the position, orientation or presence of a person within the automobile seat, if the presence of the sensor electrodes is uncomfortable to the person in the seat, or creates an excessive cost in the production of the automobile, it is less likely that such a system will be accepted by the ultimate purchaser and user of the automobile.

In applications such as sensors in an automobile seat, or other applications where the sensor is placed in close proximity to an individual, factors such as the sensor flexibility, comfort and durability are critical for successful use and acceptance of the sensor array in the intended application. The sensor must be flexible because it is being placed in a flexible or resilient medium (such as a seat cushion), it must be comfortable (undetectable) to the user, and it must be durable so that it does not need to be replaced during the life of the object in which it is placed.

In addition, because it is anticipated that the sensor will be used in high volume applications, it is important that its construction be equally capable of high volume and low-cost production.

SUMMARY OF THE INVENTION

The present invention provides a flexible conductive electrode antenna which may be manufactured in high volume and at low cost, while still providing the necessary characteristics of flexibility, flame retardancy, corrosion resistance, abrasion resistance, tear resistance, and electrical reliability. The invention comprises a laminated construction having a layer of conductive material laminated between a layer of flame retardant material and a layer of protective material. The layer of conductive material is preferably a metalized polymer substrate having corrosion resistant properties. Preferably, the polymer is metalized on one side with a layer of copper disposed between layers of nickel. The flame retardant material is preferably a glass cloth laminated to the non-metalized side of the polymer substrate. The protective material is preferably a non-woven material laminated to the metalized side of the polymer substrate.

In an alternate embodiment, the layer of conductive material may comprise a conductive woven or conductive non-woven material. Also, the flame retardant layer may comprise an epoxy tape having a fire retardant component.

DETAILED DESCRIPTION OF THE INVENTION

Although those skilled in the art will readily recognize that multiple unique constructions may be created for use as a flexible sensor electrode, the present invention is described herein primarily in relation to one preferred construction. In particular, the present invention is described herein as a flexible sensor electrode having a film-fabric lamination construction (see FIGS. 1A and 1B). In addition, alternate constructions in addition to those described herein are considered within the scope and spirit of the invention.

Figure 1A:
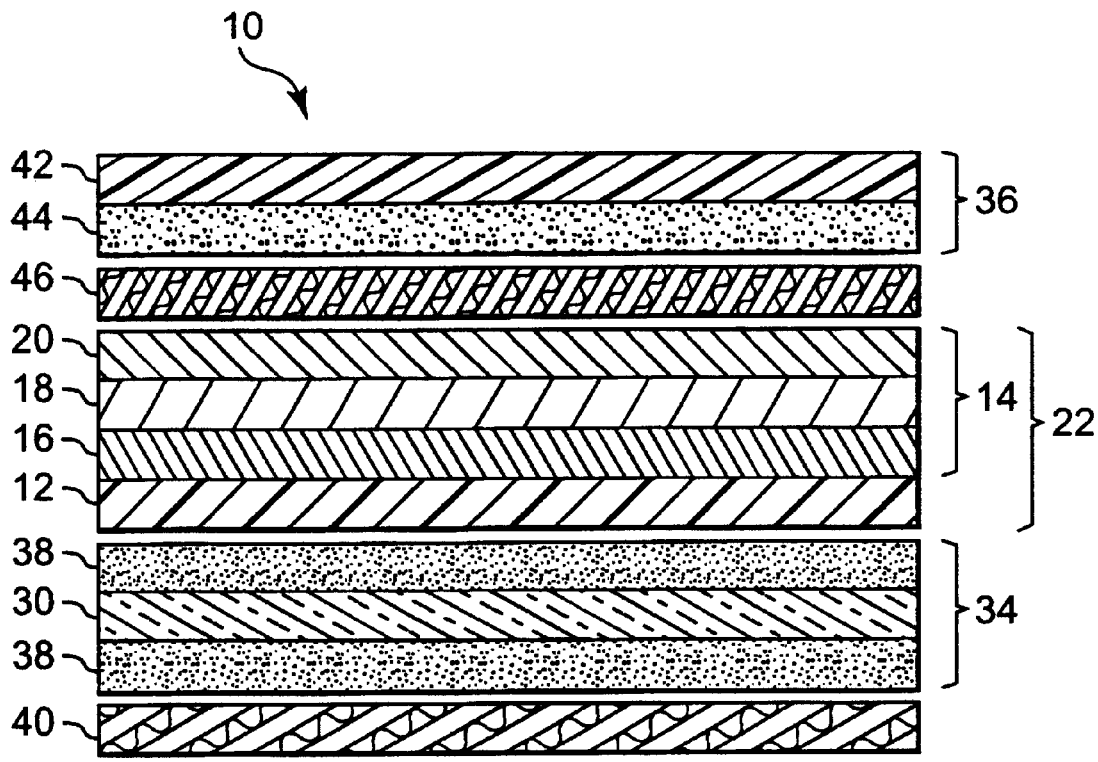
FIGS. 1A and 1B schematically illustrate a preferred construction of the electrode antenna in a partially exploded and assembled condition, respectively.
Figure 1B:
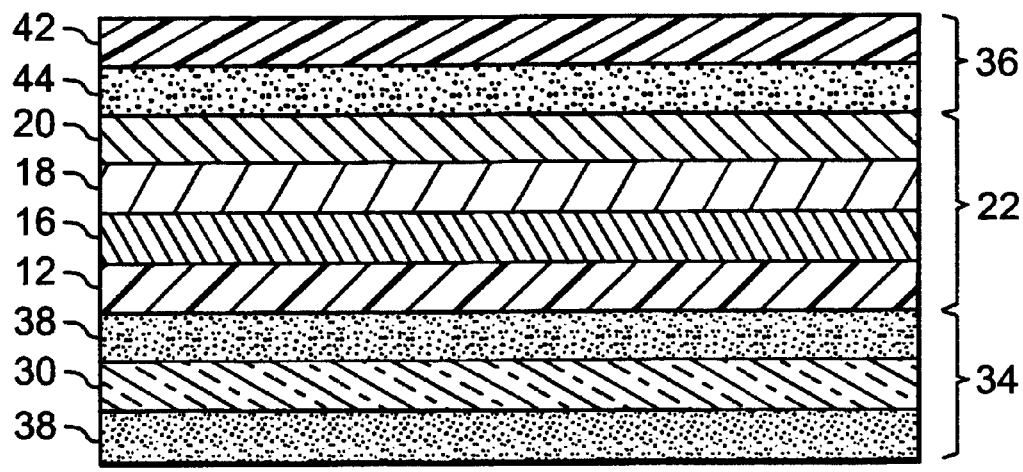

In a preferred embodiment of sensor tape 10 illustrated in FIGS. 1A and 1B, a polyester (PET) film 12 is provided as a carrier substrate to fabricate the conductive layer 14 of the sensor tape. Specifically, layers of nickel 16, copper 18 and then nickel 20 are deposited on the surface of the polyester film 12 by any suitable means known in the art. The preferred method of metalizing the substrate 12 is by vapor deposition, but other suitable methods include electroplating, and conductive ink printing, for example. The polyester film 12 provides sufficient flexibility for the final use of the sensor tape 10, while it also has sufficient rigidity for use in the metal deposition process. The nickel layers 16, 20 on either side of the copper layer 18 provide better adhesion to the polyester film substrate 12 than copper alone and also serve as corrosion protection layers for the copper layer 18. The copper layer 18 provides excellent electrical conductivity to allow the construction to act as a sensor or antenna. The thickness of the nickel layers 16, 20 is preferably in the range from 250 to 600 angstroms, and the thickness of the copper layer 18 is in the range from 2000 to 3000 angstroms. More preferably, the nickel layers 16, 20 are approximately 400 angstroms thick and the copper layer 18 is approximately 2500 angstroms thick. The preferred ranges of material thickness allow a desired balance of material flexibility and reliability, while providing adequate amounts of material for electrical conductivity and corrosion protection. If desired, an all nickel construction of the conductive layer (e.g., no copper layer) on the polyester film may also be used, in place of a nickel-copper laminate as described above.

Figure 2:
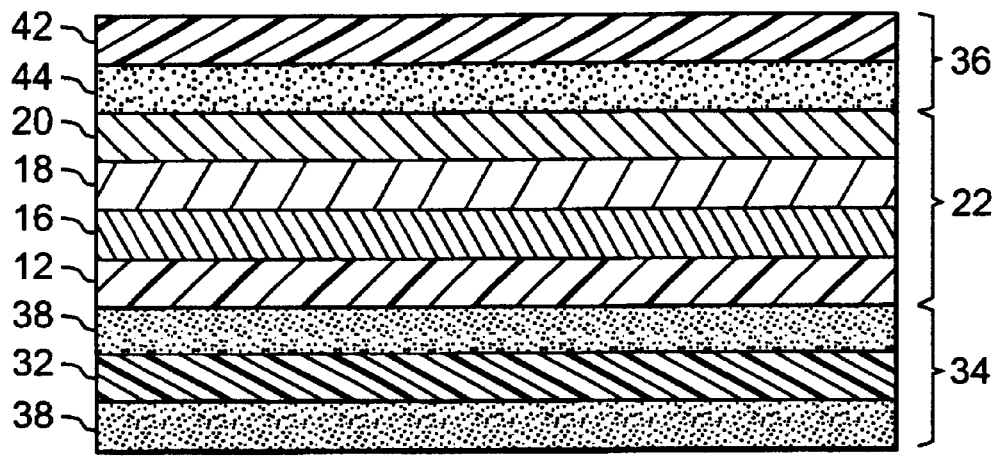
FIG. 2 schematically illustrates an alternate embodiment of the electrode antenna.

Using the polyester substrate 12 with copper and nickel metalizing layers as described above ("nickel-copper laminate 22" herein), several unique sensor tape constructions may be produced. Examples of these of the different types of tape constructions include: laminating the nickel-copper laminate 22 to epoxy film tapes 32 (FIG. 2) and laminating the nickel-copper laminate to glass cloth fabric 30 to provide inherent flame retardancy, flexibility, and puncture and tear resistance (FIG. 1B). In certain applications, it may be desired to use specialized adhesives, such as A25 high performance adhesive (available from 3M) to permit adhesive bonding to polyethylene film, such as those used in car seat construction.

A25 High Performance Adhesive is made by Minnesota Mining and Manufacturing Company (3M) of St. Paul, Minn., USA. This adhesive is ideal for joining a wide variety of similar and dissimilar materials where high bond strength, high shear strength, high temperature performance and good UV resistance are required. A25 High Performance Adhesive is a firm acrylic pressure sensitive adhesive system.

As noted above, the preferred construction is shown in FIGS. 1A and 1B. In addition to the nickel-copper laminate 22 described above, the electrode antenna preferably includes a reinforcement and flame retardant layer 34 and a protective layer 36 over the nickel-copper laminate 22. Preferably, the nickel-copper laminate 22 is positioned between the reinforcement and flame retardant layer 34 and the protective layer 36 to maximize the protection afforded to the nickel-copper laminate layer 22.

As seen in FIGS. 1A and 1B, the reinforcement and flame retardant layer 34 preferably comprises a layer of glass cloth 30 with an adhesive 38 (either a heat sensitive adhesive (HSA) or a pressure sensitive adhesive (PSA)) used to bond the glass cloth 30 to other parts of the construction. A suitable glass cloth 30 is blown glass fiber (BGF) cloth. A suitable adhesive 38 is the A25 high performance adhesive system available from Minnesota Mining and Manufacturing Company. A removable and disposable release liner 40 may be used to protect the adhesive 38 prior to the final lamination of the sensor tape assembly 10.

The protective layer 36 preferably comprises a layer of non-woven material 42 such as PET, or any other suitable nonwoven material, such as rayon or Teflon®. An adhesive layer 44 is used to bond the protective layer material 42 to the nickel-copper laminate 22. A non-woven material is preferred because such a material is flexible and breathable. A preferred non-woven material is available from Minnesota Mining and Manufacturing Company under the designation 1157R tape. 1157R tape is a porous 100% Rayon non-woven fiber backing tape. 1157R tape is specifically designed to allow thorough penetration of the impregnating resin inside bobbin-wound coils. An acrylic adhesive is preferably used with the 1157R nonwoven material. Another advantage of the preferred 1157R tape is its ability, because of its porosity, to pick up resin and become thicker, making a hard moisture and mechanical barrier. The protective layer 36 preferably uses a water-based acrylic adhesive such as the adhesive available under the designation RD814 from Minnesota Mining and Manufacturing Company. Alternate adhesives include acrylic iso-octylacrylate/acrylic acid (IOA/AA) or 2-ethylhexyl acrylate/acrylic acid (EHA/AA) with corrosion inhibitor additives. A removable and disposable release liner 46 may be used to protect the adhesive 44 prior to the final lamination of the sensor tape assembly 10.

Figure 3A:
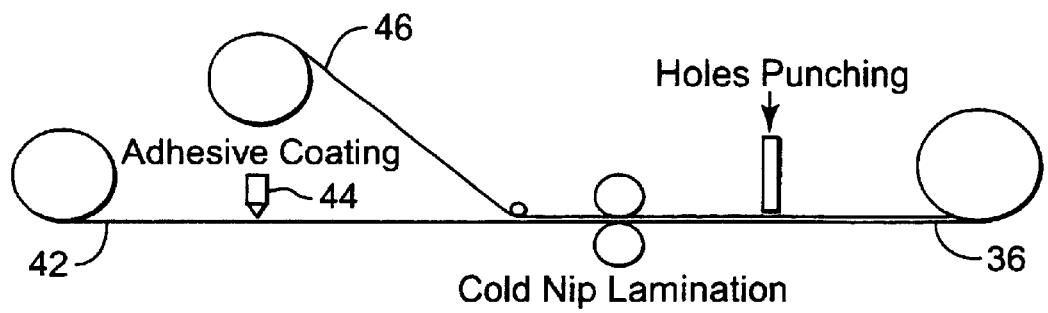
FIGS. 3A–3D schematically illustrate the manufacture of the electrode antenna of FIGS. 1A and 1B.
Figure 3B:
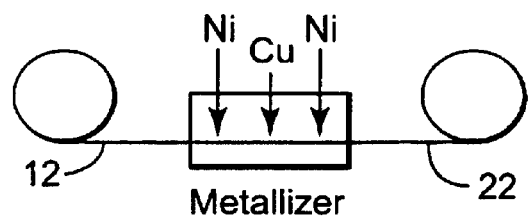
Figure 3C:
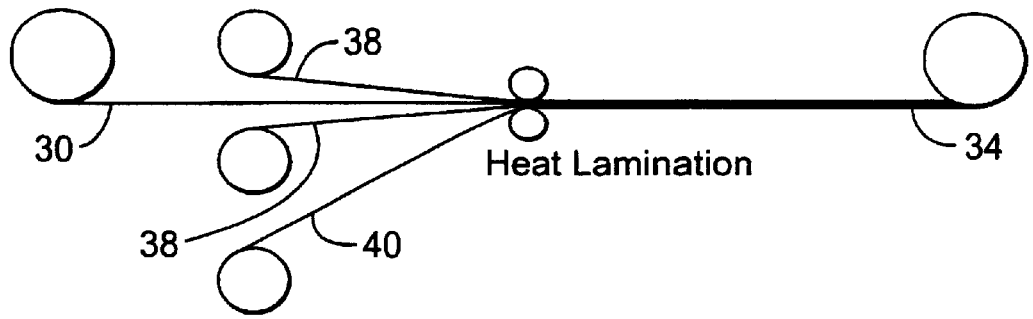

The preferred process for constructing the tape sensor construction of FIGS. 1A and 1B is shown in FIGS. 3A–3D. As illustrated in FIGS. 3A–3C respectively, the protective layer 36, the nickel-copper laminate layer 22, and the reinforcement fire retardant layer 34 are individually formed. In FIG. 3A, a non-woven protective material 42 is coated with adhesive 44 and then laminated with a release liner 46. After the lamination, the assembly may be punched to create any openings needed in the final sensor construction. In FIG. 3B, a PET substrate 12 is metalized to create the nickel-copper laminate 22. In FIG. 3C, a reinforcing and fire retardant glass cloth 30 is laminated between layers of adhesive 38. A release liner 40 is also included in the lamination to protect the adhesive layer 38 until the final lamination step.

Figure 3D:
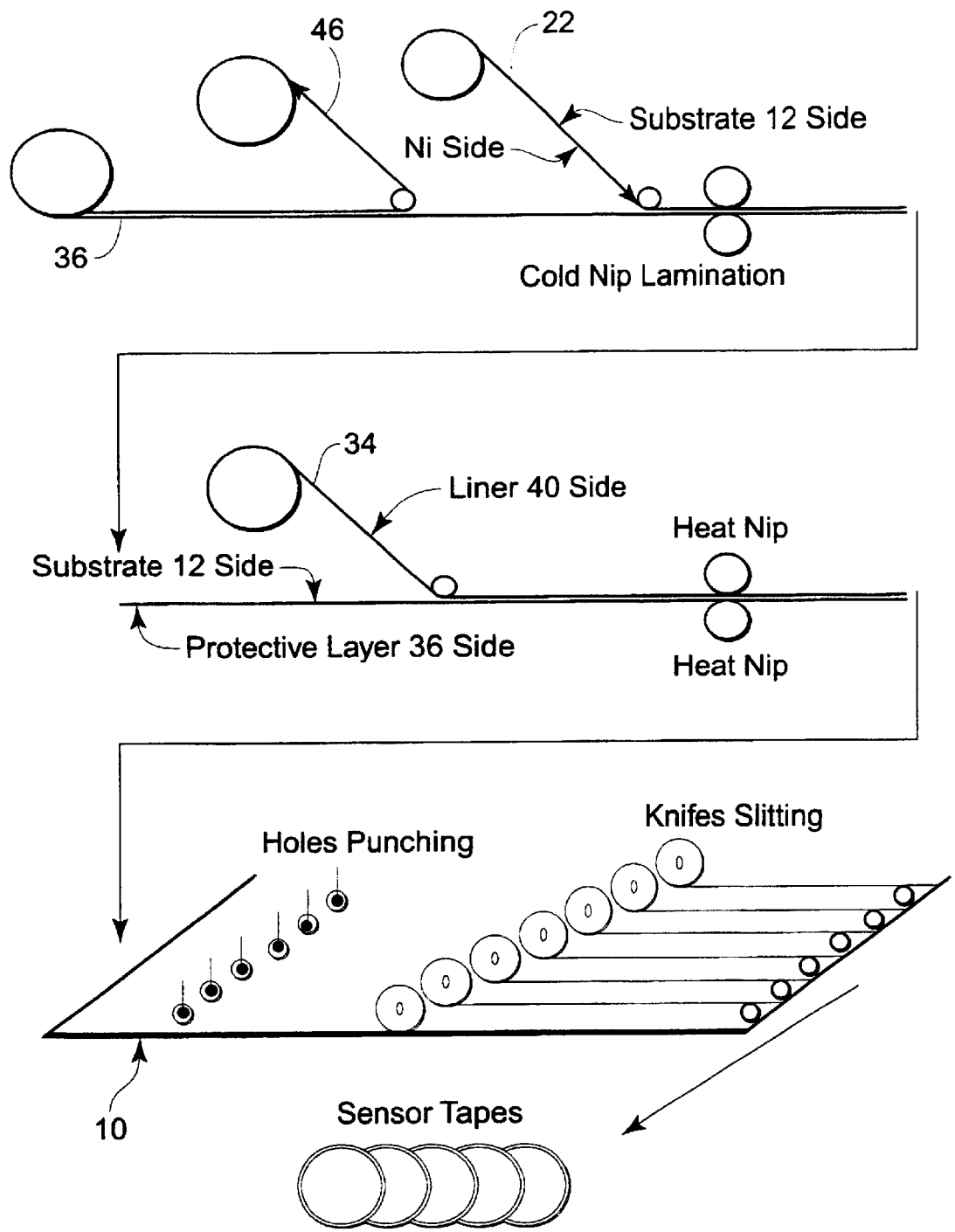

After the individual protective layer 36, nickel-copper laminate layer 22, and reinforcement fire retardant layer 34 are created, these separate elements 36, 22, 34 are laminated together as shown in FIG. 3D. A final slitting or cutting process creates the individual sensors which may then be used for their intended purposes.

The sensor construction described herein has numerous advantages for its intended use. Those advantages are described in greater detail below.

Flexibility

Figure 5:
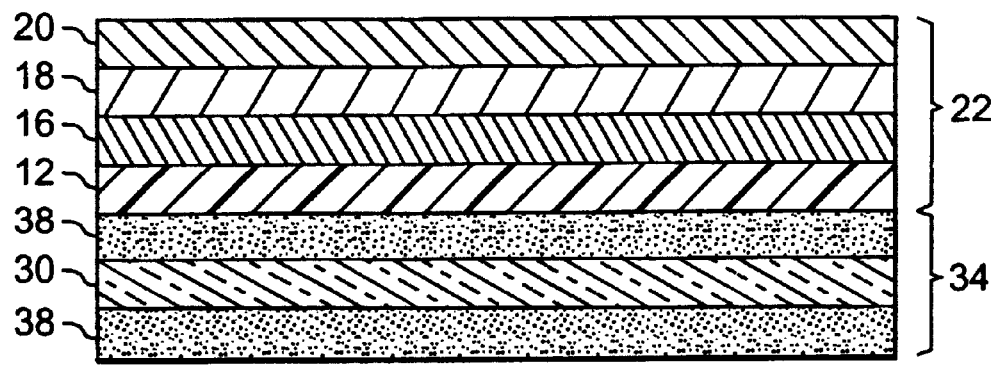
FIG. 5 schematically illustrates an alternate embodiment of the electrode antenna schematically.
Figure 4:
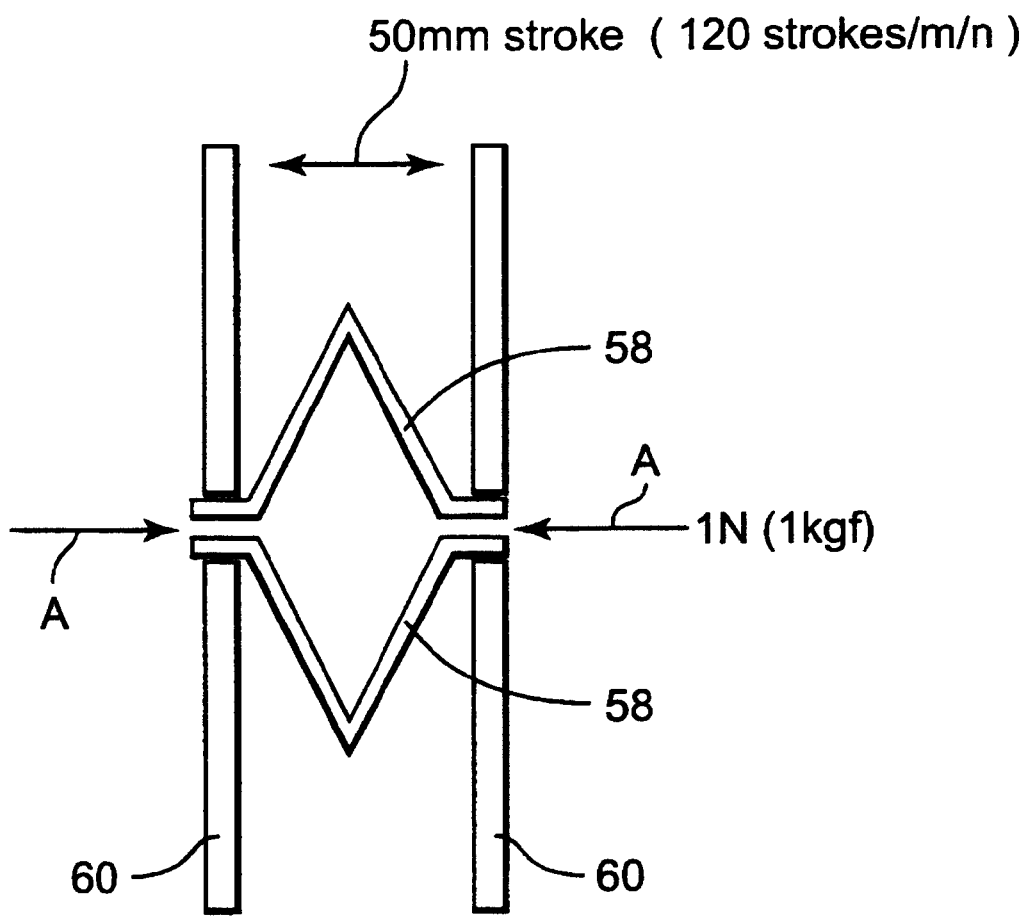
FIG. 4 illustrates a creasing machine for testing the electrode antenna.

An advantage of the above-described sensor construction 10 is its inherent flexibility, conformability and durability. To demonstrate the flexibility of the flexible electrode tape 10 described herein, individual sensors were created as described above and crease-flex testing was performed. The crease-flex testing used a creasing machine as illustrated in FIG. 4. The creasing machine used a creasing stroke of 50 mm, a pressing load of 9.8 N (1 kilogram force) and a creasing speed of 120 strokes/minute. The creasing machine was used to repeatedly crease samples of the flexible electrode antenna described herein, as well as alternative electrode antenna constructions. The tests were performed by placing two test samples 58 of sensor material of the same size (approximately 2 inches by 6 inches in size) with the glass cloth side on the outside of the crease. The samples were positioned so that the crease formed across the shorter dimension of the sample. The distance between the clamping members 60 was gradually decreased by applying a pressing load in the direction of arrow A so that the two test samples 58 creased until the folded sample came into contact with itself. The creasing test then proceeded with test load applied. The electrical resistance between the farthest points on the test samples 58 was checked after every 120 creasing cycles. The results of the tests are shown in Tables 1–2 below. The materials tested included the above-described antenna material with a 1157R tape backing (FIG. 1B) and the above-described antenna material without a 1157R tape backing (FIG. 5).

TABLE 1

Antenna Material - Without 1157R Tape Backing

| Number of Strokes | Sample 1 (Ohms) | Sample 2 (ohms) | Sample 3 (ohms) | Sample 4 (ohms |
|---|---|---|---|---|
| 0 | .41 | .41 | .4 | .43 |
| 120 | .48 | .43 | .51 | .43 |
| 240 | .48 | .49 | .54 | .45 |
| 360 | .49 | .51 | .54 | .48 |
| 480 | .47 | .51 | .58 | .59 |
| 600 | .60 | .58 | .57 | .63 |
| 720 | .63 | .59 | .61 | .63 |
| 840 | .64 | .61 | .59 | .66 |
| 960 | .66 | .61 | .69 | .67 |

TABLE 1-continued

Antenna Material - Without 1157R Tape Backing

| Number of Strokes | Sample 1 (Ohms) | Sample 2 (ohms) | Sample 3 (ohms) | Sample 4 (ohms) |
|---|---|---|---|---|
| 1080 | .66 | .67 | .65 | .65 |
| 1200 | .67 | .63 | .64 | .65 |

TABLE 2

Antenna Material - With 1157R Tape Backing

| Number of Strokes | Sample 1 (ohms) | Sample 2 (ohms) | Sample 3 (ohms) | Sample 4 (ohms) |
|---|---|---|---|---|
| 0 | .45 | .40 | .41 | .37 |
| 600 | .50 | .47 | .51 | .60 |
| 1200 | .61 | .68 | .55 | .63 |

Flame Retardancy

Because the sensor described herein is anticipated for use in automobiles and other applications where flame retardancy is desired or required, flame retardant testing was conducted following FM VSSN302 test standards, with the results shown in Table 3.

TABLE 3

| Material | Burn Rate | Observation |
|---|---|---|
| Conductive layer laminated to a glass cloth | 2.3 inches/minute | Pass test standard |
| Conductive layer laminated to an epoxy tape with fire retardant backing | 3.8 inches/minute | Pass test standard |
| Conductive layer laminated to a glass cloth and A25 adhesive system | 3.6 inches/minute | Pass test standard |
| Conductive layer laminated to an epoxy tape with fire retardant backing and A25 adhesive system | 5.9 inches/minute | Fail test standard |

The epoxy tape with fire retardant backing is available from Minnesota Mining and Manufacturing Company under the designation 3M #1 electrical tape. As can be seen from the test results, the glass cloth fabric has an inherent flame retardant property which makes the total construction of the prototype using glass cloth in the construction pass flammability tests under the cited test standard.

Abrasion Resistance

Abrasion testing on the conductive surface of the sensor tape was conducted by preparing circular samples of the sensor tape. Each sample had a 4.1 inch (10.4 cm) diameter and a 6 mm diameter hole in the center of the sample. Samples with and without a protective layer 36 were prepared. The protective layer 36 consisted of a non-woven material adhered to the conductive surface with an acrylic adhesive. The non-woven acrylic tape used in the test was 1157R tape available from Minnesota Mining and Manufacturing Company. The initial electrical resistance of each sample was recorded by placing one electrical probe near the hole in the center of the sample and another electrical probe at the outer circumference of the sample. A Taber abraser machine (available from Taber Industries of North Tonawanda, N.Y., USA) was used to abrade the samples in the following manner: The test samples were placed on the abraser holding apparatus with the conductive layer of the sensor tape facing up. A CS10 abrasion wheel (available from Taber Industries) was installed on the abraser machine and a test load applied to the wheel. 1,000 cycles were performed with the abraser machine. After the abraser machine had stopped, the electrical resistance of the sample was again tested by placing one probe at the edge of the center hole of the sample, and the second probe at the outer edge of the sample. The results of the abrasion testing are shown in Table 4.

TABLE 4

| Sample Description | Load | Initial Resistance | Final Result Resistance |
|---|---|---|---|
| No protective layer | 0.25 kgf | 0.65 Ω | 15.5 Ω |
| No protective layer | 0.50 kgf | 0.65 Ω | 2.000 Ω |
| With protective layer | 0.25 kgf | 0.65 Ω | 0.65 Ω |
| With protective layer | 0.50 kgf | 0.65 Ω | 0.65 Ω |

As can be seen from the abrasion test data, the addition of a non-woven protection layer with an acrylic adhesive on the top of the conductive surface of the sensor tape provides adequate protection to the conductive layer to prevent the conductive layer from being abraded. The load used in the abrasion testing has no effect when the 1157R protective layer is incorporated into the construction. Without the protective layer 36, the load has a significant effect on the final resistance of the test sample. After the abrasion test, the nickel protective layer 20 could not be detected when the non-woven acrylic tape protective layer was not used. The removal of the nickel layer 20 would result in poor corrosion protection for the copper layer 18. Thus, after exposure to room temperatures and humidity the exposed copper layer 18 would eventually corrode completely and fail.

Electrical Resistance Reliability

Electrical resistance testing was conducted for multiple samples of the sensors to demonstrate the consistency and reliability of the inventive construction described herein. The results of the resistance testing are shown in Table 5.

The designations LR1, LR2, etc. designate different sensor shapes. As can be seen, the resistance reading for each sensor is well under 1 Ω, which is important for the use of the sensor in its intended applications. It is preferred to maintain the resistance for individual sensors below 1 Ω so that the sensors are suitable for use in a system that requires extensive signal processing. Low resistance also minimizes power drainage, and provides a high differential from the surrounding insulation material in areas of high humidity (such as when an automobile seat is wet from spilled liquid). The resistance readings were taken from the farthest points in each sensor.

TABLE 5

| | Electrical Resistance (Ohm) | | | | | | |
|---|---|---|---|---|---|---|---|
| Sample No. | LR1 | LR2 | LR3 | LR4 | UR5 | UR6 | SR7 |
| A1 | 0.5 | 0.3 | 0.4 | 0.4 | 0.5 | 0.5 | 0.4 |
| A2 | 0.5 | 0.4 | 0.4 | 0.4 | 0.5 | 0.5 | 0.4 |
| A3 | 0.5 | 0.4 | 0.4 | 0.4 | 0.5 | 0.5 | 0.4 |
| A4 | 0.6 | 0.4 | 0.4 | 0.4 | 0.5 | 0.5 | 0.4 |
| A5 | 0.4 | 0.4 | 0.4 | 0.4 | 0.5 | 0.6 | 0.4 |
| A6 | 0.5 | 0.4 | 0.4 | 0.4 | 0.5 | 0.5 | 0.4 |
| A7 | 0.6 | 0.3 | 0.4 | 0.4 | 0.5 | 0.5 | 0.4 |
| A8 | 0.5 | 0.5 | 0.5 | 0.5 | 0.5 | 0.5 | 0.4 |
| A9 | 0.5 | 0.4 | 0.4 | 0.4 | 0.6 | 0.5 | 0.5 |
| A10 | 0.6 | 0.4 | 0.4 | 0.4 | 0.6 | 0.5 | 0.4 |

TABLE 5-continued

Electrical Resistance (Ohm)

| Sample No. | LR1 | LR2 | LR3 | LR4 | UR5 | UR6 | SR7 |
|---|---|---|---|---|---|---|---|
| A11 | 0.4 | 0.4 | 0.4 | 0.4 | 0.4 | 0.5 | 0.4 |
| A12 | 0.5 | 0.4 | 0.4 | 0.4 | 0.4 | 0.4 | 0.4 |
| A13 | 0.6 | 0.4 | 0.4 | 0.4 | 0.4 | 0.4 | 0.4 |
| A14 | 0.5 | 0.3 | 0.4 | 0.3 | 0.5 | 0.4 | 0.4 |
| A15 | 0.5 | 0.4 | 0.5 | 0.4 | 0.5 | 0.4 | 0.4 |
| A16 | 0.4 | 0.4 | 0.4 | 0.4 | 0.5 | 0.4 | 0.5 |
| A17 | 0.5 | 0.4 | 0.4 | 0.4 | 0.5 | 0.5 | 0.4 |
| A18 | 0.6 | 0.5 | 0.4 | 0.4 | 0.5 | 0.5 | 0.4 |
| A19 | 0.5 | 0.4 | 0.3 | 0.4 | 0.5 | 0.5 | 0.4 |
| A20 | 0.5 | 0.4 | 0.4 | 0.4 | 0.5 | 0.5 | 0.4 |
| A21 | 0.5 | 0.4 | 0.4 | 0.4 | 0.4 | 0.5 | 0.4 |
| A22 | 0.4 | 0.4 | 0.4 | 0.4 | 0.6 | 0.5 | 0.5 |
| A23 | 0.5 | 0.3 | 0.4 | 0.4 | 0.5 | 0.5 | 0.4 |
| A25 | 0.5 | 0.4 | 0.4 | 0.4 | 0.5 | 0.5 | 0.4 |
| A26 | 0.5 | 0.4 | 0.4 | 0.4 | 0.5 | 0.5 | 0.4 |
| A27 | 0.5 | 0.4 | 0.4 | 0.4 | 0.5 | 0.5 | 0.3 |
| A28 | 0.6 | 0.4 | 0.4 | 0.4 | 0.5 | 0.5 | 0.4 |
| A29 | 0.5 | 0.4 | 0.4 | 0.4 | 0.5 | 0.5 | 0.4 |
| A30 | 0.5 | 0.4 | 0.5 | 0.4 | 0.5 | 0.5 | 0.3 |
| A31 | 0.4 | 0.4 | 0.5 | 0.5 | 0.5 | 0.5 | 0.4 |
| A32 | 0.5 | 0.4 | 0.5 | 0.5 | 0.6 | 0.5 | 0.4 |
| A33 | 0.6 | 0.4 | 0.5 | 0.5 | 0.6 | 0.6 | 0.4 |
| A34 | 0.5 | 0.4 | 0.5 | 0.5 | 0.5 | 0.6 | 0.4 |
| A35 | 0.5 | 0.4 | 0.4 | 0.4 | 0.5 | 0.4 | 0.4 |
| A36 | 0.4 | 0.4 | 0.3 | 0.4 | 0.5 | 0.4 | 0.4 |
| A37 | 0.5 | 0.4 | 0.3 | 0.3 | 0.5 | 0.5 | 0.4 |
| Avg. Type A | 0.503 | 0.394 | 0.411 | 0.408 | 0.603 | 0.488 | 0.403 |
| B1 | 0.5 | 0.5 | 0.4 | 0.4 | 0.5 | 0.5 | 0.4 |
| B2 | 0.5 | 0.4 | 0.4 | 0.4 | 0.5 | 0.5 | 0.4 |
| B3 | 0.5 | 0.4 | 0.4 | 0.4 | 0.5 | 0.5 | 0.4 |
| B4 | 0.4 | 0.3 | 0.4 | 0.4 | 0.5 | 0.5 | 0.4 |
| B5 | 0.4 | 0.4 | 0.4 | 0.4 | 0.5 | 0.6 | 0.4 |
| B6 | 0.5 | 0.4 | 0.4 | 0.4 | 0.5 | 0.5 | 0.5 |
| B7 | 0.4 | 0.4 | 0.4 | 0.4 | 0.5 | 0.5 | 0.5 |
| B8 | 0.5 | 0.4 | 0.4 | 0.4 | 0.5 | 0.5 | 0.3 |
| B9 | 0.6 | 0.4 | 0.4 | 0.4 | 0.4 | 0.5 | 0.3 |
| B10 | 0.5 | 0.3 | 0.3 | 0.3 | 0.4 | 0.5 | 0.3 |
| B11 | 0.5 | 0.5 | 0.4 | 0.4 | 0.4 | 0.5 | 0.4 |
| B12 | 0.5 | 0.4 | 0.4 | 0.4 | 0.6 | 0.5 | 0.4 |
| B13 | 0.5 | 0.4 | 0.4 | 0.4 | 0.5 | 0.6 | 0.4 |
| B14 | 0.5 | 0.4 | 0.4 | 0.4 | 0.6 | 0.6 | 0.4 |
| B15 | 0.4 | 0.4 | 0.4 | 0.4 | 0.4 | 0.4 | 0.4 |
| B16 | 0.4 | 0.4 | 0.4 | 0.4 | 0.5 | 0.5 | 0.4 |
| B17 | 0.6 | 0.4 | 0.4 | 0.4 | 0.5 | 0.5 | 0.4 |
| B18 | 0.5 | 0.4 | 0.4 | 0.4 | 0.5 | 0.5 | 0.4 |
| B19 | 0.5 | 0.4 | 0.4 | 0.4 | 0.5 | 0.5 | 0.4 |
| B20 | 0.5 | 0.3 | 0.4 | 0.4 | 0.5 | 0.5 | 0.4 |
| B21 | 0.5 | 0.3 | 0.3 | 0.4 | 0.6 | 0.6 | 0.5 |
| B22 | 0.5 | 0.5 | 0.4 | 0.4 | 0.5 | 0.5 | 0.3 |
| B23 | 0.5 | 0.4 | 0.4 | 0.4 | 0.4 | 0.4 | 0.3 |
| B24 | 0.4 | 0.4 | 0.4 | 0.4 | 0.6 | 0.6 | 0.3 |
| B25 | 0.4 | 0.4 | 0.4 | 0.4 | 0.5 | 0.5 | 0.3 |
| B26 | 0.5 | 0.4 | 0.5 | 0.5 | 0.5 | 0.5 | 0.3 |
| B27 | 0.6 | 0.4 | 0.4 | 0.4 | 0.5 | 0.5 | 0.4 |
| B28 | 0.5 | 0.5 | 0.4 | 0.5 | 0.5 | 0.5 | 0.4 |
| B29 | 0.5 | 0.4 | 0.4 | 0.4 | 0.5 | 0.4 | 0.4 |
| B30 | 0.5 | 0.4 | 0.4 | 0.4 | 0.4 | 0.6 | 0.4 |
| B31 | 0.6 | 0.4 | 0.4 | 0.4 | 0.4 | 0.4 | 0.4 |
| B32 | 0.5 | 0.5 | 0.4 | 0.4 | 0.5 | 0.5 | 0.4 |
| B33 | 0.5 | 0.3 | 0.5 | 0.5 | 0.5 | 0.5 | 0.4 |
| B34 | 0.5 | 0.3 | 0.3 | 0.3 | 0.5 | 0.5 | 0.4 |
| B35 | 0.5 | 0.4 | 0.4 | 0.4 | 0.5 | 0.5 | 0.4 |
| B36 | 0.4 | 0.4 | 0.4 | 0.4 | 0.4 | 0.4 | 0.5 |
| B37 | 0.4 | 0.4 | 0.4 | 0.4 | 0.6 | 0.6 | 0.3 |
| Avg. Type B | 0.486 | 0.397 | 0.397 | 0.403 | 0.492 | 0.505 | 0.386 |
| C1 | 0.5 | 0.4 | 0.4 | 0.4 | 0.5 | 0.5 | 0.4 |
| C2 | 0.5 | 0.4 | 0.4 | 0.4 | 0.5 | 0.5 | 0.4 |
| C3 | 0.5 | 0.4 | 0.4 | 0.4 | 0.5 | 0.5 | 0.4 |
| C4 | 0.5 | 0.4 | 0.4 | 0.4 | 0.5 | 0.5 | 0.4 |
| C5 | 0.4 | 0.4 | 0.4 | 0.4 | 0.5 | 0.5 | 0.5 |
| C6 | 0.5 | 0.4 | 0.4 | 0.4 | 0.4 | 0.4 | 0.3 |
| C7 | 0.5 | 0.4 | 0.4 | 0.4 | 0.5 | 0.5 | 0.4 |
| Avg. Type C | 0.486 | 0.400 | 0.400 | 0.400 | 0.486 | 0.486 | 0.400 |
| D1 | 0.6 | 0.4 | 0.4 | 0.4 | 0.5 | 0.5 | 0.4 |
| D2 | 0.5 | 0.3 | 0.3 | 0.3 | 0.5 | 0.5 | 0.4 |
| D3 | 0.5 | 0.5 | 0.5 | 0.5 | 0.5 | 0.4 | 0.4 |
| D4 | 0.5 | 0.4 | 0.4 | 0.4 | 0.6 | 0.6 | 0.4 |
| D5 | 0.5 | 0.4 | 0.4 | 0.4 | 0.5 | 0.5 | 0.3 |
| D6 | 0.5 | 0.4 | 0.4 | 0.4 | 0.5 | 0.5 | 0.5 |
| D7 | 0.5 | 0.4 | 0.4 | 0.4 | 0.5 | 0.5 | 0.4 |
| Avg. Type D | 0.514 | 0.400 | 0.400 | 0.400 | 0.514 | 0.500 | 0.400 |

Tear Resistance

The preferred embodiment of the flexible electrode antenna provides excellent tear resistance, which is also important in its intended final use. Samples of the preferred embodiment were tested following the standard test method for initial tear resistance of plastic film and sheeting (ASTM D 1004-94A). Following the guidelines of the ASTM test procedures, failure values in the range from 8.0 to 11.6 lbs. in the machine direction, and 9.7 to 20.7 in the cross direction were obtained. During the testing, the glass cloth fabric did not tear. Rather, the failure occurred in the metalized film layer. Without the glass cloth reinforcement, the metalized film layer failed at between 3.5 and 5.1 lbs. As can be seen, the addition of the glass cloth reinforcement significantly improves the tear resistance of the samples.

Corrosion Resistance

Because the copper conductive layer will corrode easily with the moisture and heat typically present in an automobile, the corrosion protection provided by the nickel layer is very beneficial. The effect of the nickel protective layer 16, 20 was demonstrated with tests in a humidity chamber. Samples of the copper conductive layer 18 with and without a nickel protective layer 16, 20 were placed in a humidity chamber at 55° C. with 100% humidity, and the resistance of the samples was measured at one week intervals. As can be seen from Table 6, samples protected with nickel layers 16, 20 exhibited good resistance to corrosion (and thus experienced a minimal increase in resistance), while samples with no nickel protective layer 16, 20 had resistances which rapidly increased until the resistance reached infinity. Importantly, the samples which used the nickel protective layer maintained a resistance of less than 1 Ω, which is necessary for the intended use of the sensor.

TABLE 6

| | Sample with nickel protective layer | | | Sample with no protective layer | | |
|---|---|---|---|---|---|---|
| Initial Resistance Ω | .56 | .60 | .60 | .45 | .50 | .45 |
| 1 week Ω | .60 | .61 | .61 | .75 | .75 | .85 |
| 2 weeks Ω | .65 | .68 | .68 | 100 | 600 | 250 |
| 3 weeks Ω | .75 | .70 | .63 | 2000 | 2500 | 2030 |
| 4 weeks Ω | .74 | .73 | .70 | ∞ | ∞ | ∞ |
| 5 weeks Ω | .79 | .75 | .70 | ∞ | ∞ | ∞ |
| 6 weeks Ω | .79 | .89 | .72 | ∞ | ∞ | ∞ |

Alternative Embodiment

As an alternative to forming the conductive tape as a film fabric laminate as described above, the conductive tape could also be formed as a conductive fabric or non-woven material. In this type of construction, the nickel-copper laminate 22 described above would be replaced by a conductive fabric or non-woven material. A fabric or a non-woven material may be formed of either a conductive material or formed of a non-conductive material which is coated with a conductive material, such as copper and/or nickel. The fabric would preferably have a tensile strength of approximately 60 to 70 lbs./inch and a tearing strength of approximately 6 to 10 lbs. in both the warp and weft directions. A surface resistance of 0.10 Ω per square inch is desirable. The conductivity of the conductive material could be promoted by the wet or dry deposition of copper onto the fabric with adequate thickness of nickel for corrosion protection. The conductive fabric could be further finished with an additional surface coating or lamination to provide flammability resistance or retardance. As with the film fabric lamination concept, the adhesive layer should be aggressive enough to adhere to, for example, polyurethane foam as is used in car seat constructions.

Separation into Individual Sensors

Figure 6A:
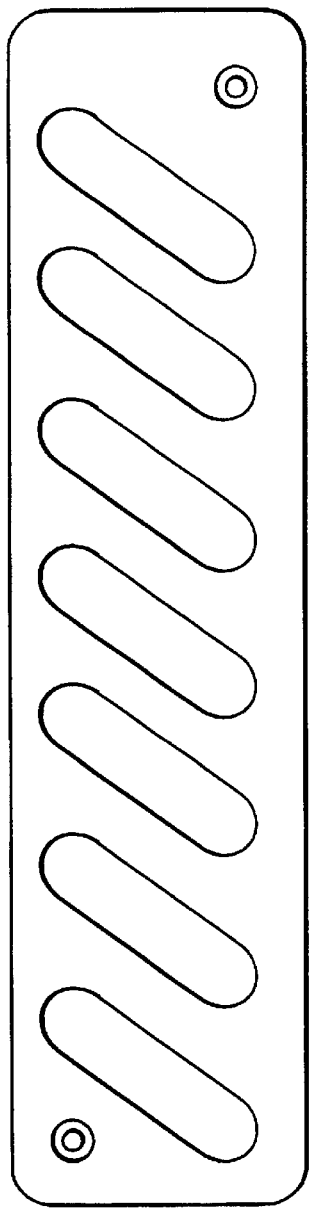
FIGS. 6A–6C show various sensor shapes after being cut from the sensor tape material.
Figure 6B:
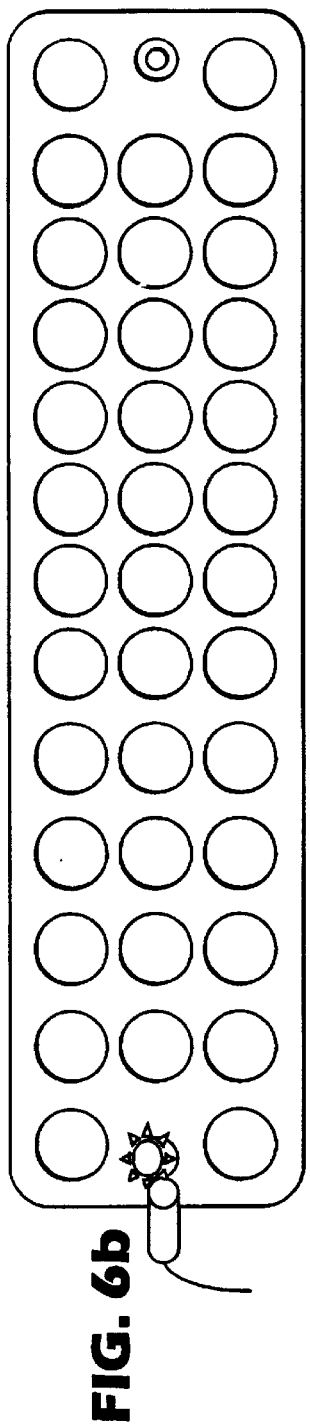
Figure 6C:
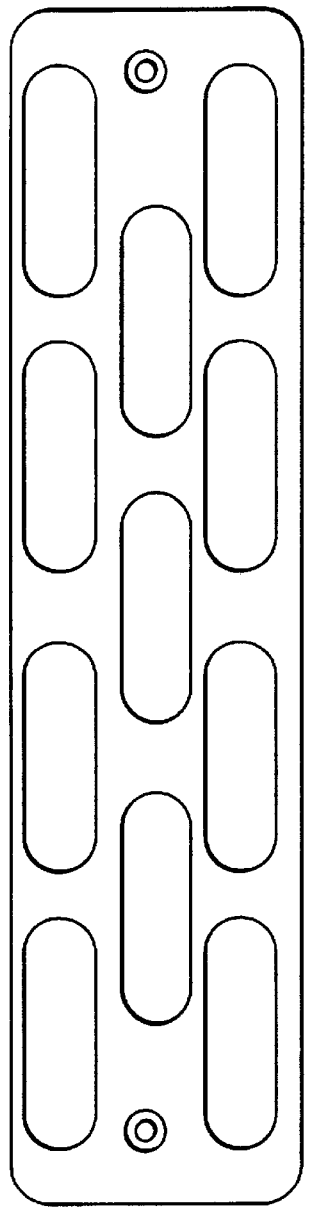

After the sensor tape has been constructed as described above, individual sensors, as shown in FIGS. 6A–6C, may be formed by, for example, die cutting the sensors from the tape. The preferred glass cloth backing 30 of the sensor tape 10 provides sufficient rigidity for the die cutting process, while still maintaining enough flexibility to use the sensor tape in applications where comfort and flexibility are significant issues.

Depending upon how the sensors are individually die cut, it may be necessary to separate adjacent sensors by, for example, laser ablation. For example, if the die cutting process is used to remove only portions of the sensor material, such as holes or openings in the sensor, a conductive pathway may still exist between adjacent sensors on the roll of sensor tape. In this instance, laser ablation of the conductive layers between adjacent sensors may be used to electrically isolate the adjacent sensors. The laser ablation process is well known, and is therefore not described in greater detail herein.

As an alternative to using laser ablation to separate adjacent sensors on the roll of sensor tape, the conductive layer may be first laminated with a non-woven protective layer to cover the entire surface of the conductive film, and then the conductive film with its protective layer may be slit into desired widths. The slit conductive film and protective layer may then be separated and laminated onto the flame retardant glass cloth backing and spaced as desired. The entire assembly may then be laminated together and the individual antennas die cut to separate the individual sensors.

A significant advantage of the sensor tape constructions described herein is their adaptability to multiple sensor configurations, such as to accommodate different seat designs. Because the sensor tape material may be easily die cut, it is very easy to change the shape or design of the sensor by simply changing the die cutting operation. It is not required to construct entirely new sensor tooling for each unique sensor shape.

Although the sensor tape described herein has been described in reference to use in an automobile seat for use with an air bag sensing system, other uses will be recognized by those skilled in the art. For example, this same type of sensor may be used in, for example, hospital beds or other medical equipment, or in any other instance in which monitoring of a defined space is required.

What is claimed is:

1. A flexible electrode antenna having a machine direction and a cross direction comprising:

a layer of conductive material comprised of a layer of copper between two layers of nickel;

a layer of flame retardant material adhered to a first side of the layer of conductive material; and a layer of non-woven protective material adhered to a second side of the layer of conductive material, wherein the antenna has tear resistance values using test standard ASTM D 1004-94A of from about 8.0 to about 11.6 pounds in the machine direction, and from about 9.7 to about 20.7 pounds in the cross direction.

2. The flexible electrode antenna of claim 1, wherein the layer of copper has a thickness in the range of 2000 to 3000 angstroms.

3. The flexible electrode antenna of claim 2, wherein the layer of copper has a thickness of about 2500 angstroms.

4. The flexible electrode antenna of claim 1, wherein the layers of nickel have a thickness in the range of 250 to 600 angstroms.

5. The flexible electrode antenna of claim 4, wherein the layers of nickel have a thickness of about 400 angstroms.

6. The flexible electrode antenna of claim 1, wherein the layer of conductive material comprises a layer of conductive non-woven material.

7. The flexible electrode antenna of claim 6, wherein the layer of conductive material comprises a layer of conductive woven material.

8. The flexible electrode antenna of claim 1, wherein the flame retardant layer is glass cloth.

9. The flexible electrode antenna of claim 8, wherein the glass cloth is formed of blown glass fibers.

10. The flexible electrode antenna of claim 1 wherein the protective material is a non-woven PET.

* * * * *